Nov. 6, 1945.    W. F. HARTMAN    2,388,539
TRAP STAND
Filed May 11, 1944

Inventor

WILLIAM FRANKLIN HARTMAN,

By Clarence A. O'Brien
and Harvey B. Jacobson
Attorneys

Patented Nov. 6, 1945

2,388,539

UNITED STATES PATENT OFFICE 2,388,539

TRAP STAND

William Franklin Hartman, Storm Lake, Iowa

Application May 11, 1944, Serial No. 535,141

1 Claim. (Cl. 43—96)

This invention relates to new and useful improvements in trap supports. Trappers, in trapping muskrats and other animals that inhabit the banks of rivers and streams employ trap supports for supporting a trap at a definite underwater position.

The principal object of the present invention is to provide a trap stand provided with a shelf upon which a trap can be held in a desirable position and further wherein bait supporting means is provided which will have the marked attribute of attracting the animal to a position where the animal can be trapped with the least likelihood of the trap being displaced before the catch is made.

Other objects and advantages of the invention will become apparent to the reader of the following description.

Figure 1:
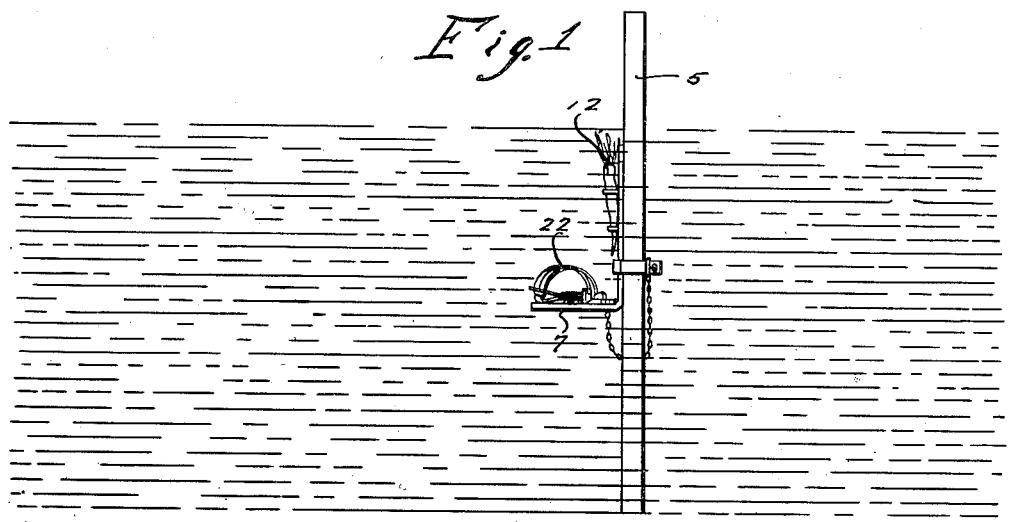
Figure 1 represents a side elevational view showing the stand with a trap supported thereby.
Figure 2:
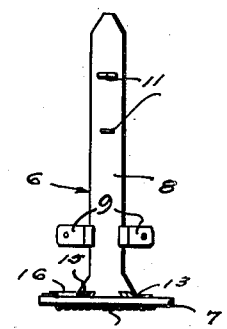
Figure 2 is a front elevational view of the trap supporting shelf and bait holder.
Figure 3:
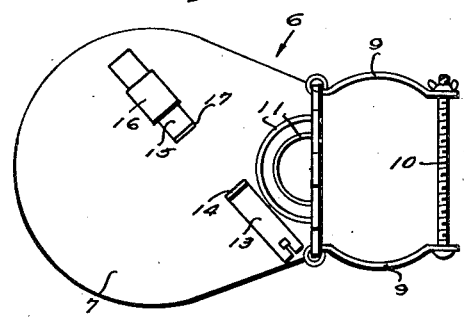
Figure 3 is a top plan view of the structure shown in Figure 2 (enlarged).
Figure 5:
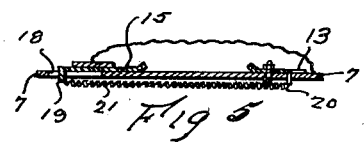
Figure 5 is a fragmentary sectional view taken on the line 5—5 of Figure 4.
Figure 4:
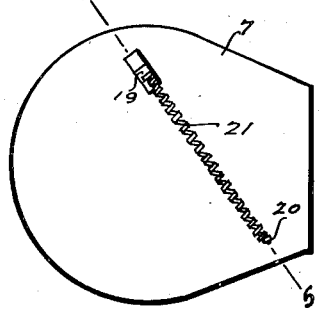
Figure 4 is a bottom plan view of the structure shown in Figures 2 and 3.

Referring to the drawing wherein like numerals designate like parts, it can be seen that numeral 5 denotes a stake which is driven into the bed of a stream or river, as suggested in Figure 1.

On this stake 5 is affixed a trap supporting shelf and bait holder assembly generally referred to by numeral 6. This unit 6 consists of a substantially circular shaped shelf 7 and a post 8 rising from the rear portion thereof.

The lower portion of the post 8 has a pair of slots therein in each of which is looped one end of a swingable clamp member 9. The remaining ends of the clamp members 9 are apertured to receive a clamp bolt 10. Thus, the assembly 6 can be clamped to a stake 5 at any desired elevation thereon.

Several eyes 11, preferably of different sizes, are located on the upper portion of the post 8 for supporting a carrot 12 or some other form of bait.

On the shelf 7 is a jaw member consisting of an elongated element 13 having a trap engaging upstanding lip 14 and this is preferably secured in fixed position, but disposed diagonally on the shelf 7.

At an opposite portion on the shelf 7 and aligned with the jaw 13, 14 is a second jaw consisting of a slide member 15 slidable through a guide 16 and having an upstanding lip 17 for engaging the opposite side of the trap from that side engaged by the lip 14.

The shelf 7 has a slot 18 therein through which depends a lip 19 on the other end of the slide 15 and connected between this lip 19 and an anchor 20 depending from the bottom side of the shelf 7 is a coiled tension spring 21.

Obviously, the slide member 15 can be pushed away from the jaw 13, 14 and a trap 22 placed on the shelf 7, after which the slide 15 can be released and the lips 14, 17 will serve to hold the trap 22 firmly on the shelf 7.

Obviously, whenever desired, the shelf and bait holding assembly 6 may be adjusted vertically on the stake 5.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A trap support comprising an upright, a shelf on the upright, jaw means on the shelf for holding a trap, said shelf being provided with an upright adjustably secured to the first-mentioned upright, and a bait holder on the adjustable upright.

WILLIAM FRANKLIN HARTMAN.